United States Patent

Gonzalez

[15] 3,700,930

[45] Oct. 24, 1972

[54] RADIATION HARDENED R-L FLIP-FLOP CIRCUIT

[72] Inventor: Xavier F. Gonzalez, Andover, N.J.

[73] Assignee: The United States of America as represented by the Secretary of the Army

[22] Filed: April 23, 1971

[21] Appl. No.: 136,691

[52] U.S. Cl.....................................307/292, 307/308
[51] Int. Cl...............................................H03k 3/286
[58] Field of Search...............307/291, 292, 314, 308

[56] References Cited

FOREIGN PATENTS OR APPLICATIONS 1,150,145 6/1963 Germany...................307/289

*Primary Examiner*—John Zazworsky
*Attorney*—Charles K. Wright, William G. Gapcynski, Lawrence A. Neureither, Leonard Flank, Jack W. Voigt and Robert C. Sims

[57] ABSTRACT

Radiation hardening is provided by inserting inductors in series with resistors in the coupling cross-over paths of the flip-flop and by shunting the resistors with back connected diodes. The time constant of the circuit is selected such that the flip-flop returns to its initial state after a high radiation level has subsided due to stored energy in one inductor.

1 Claim, 1 Drawing Figure

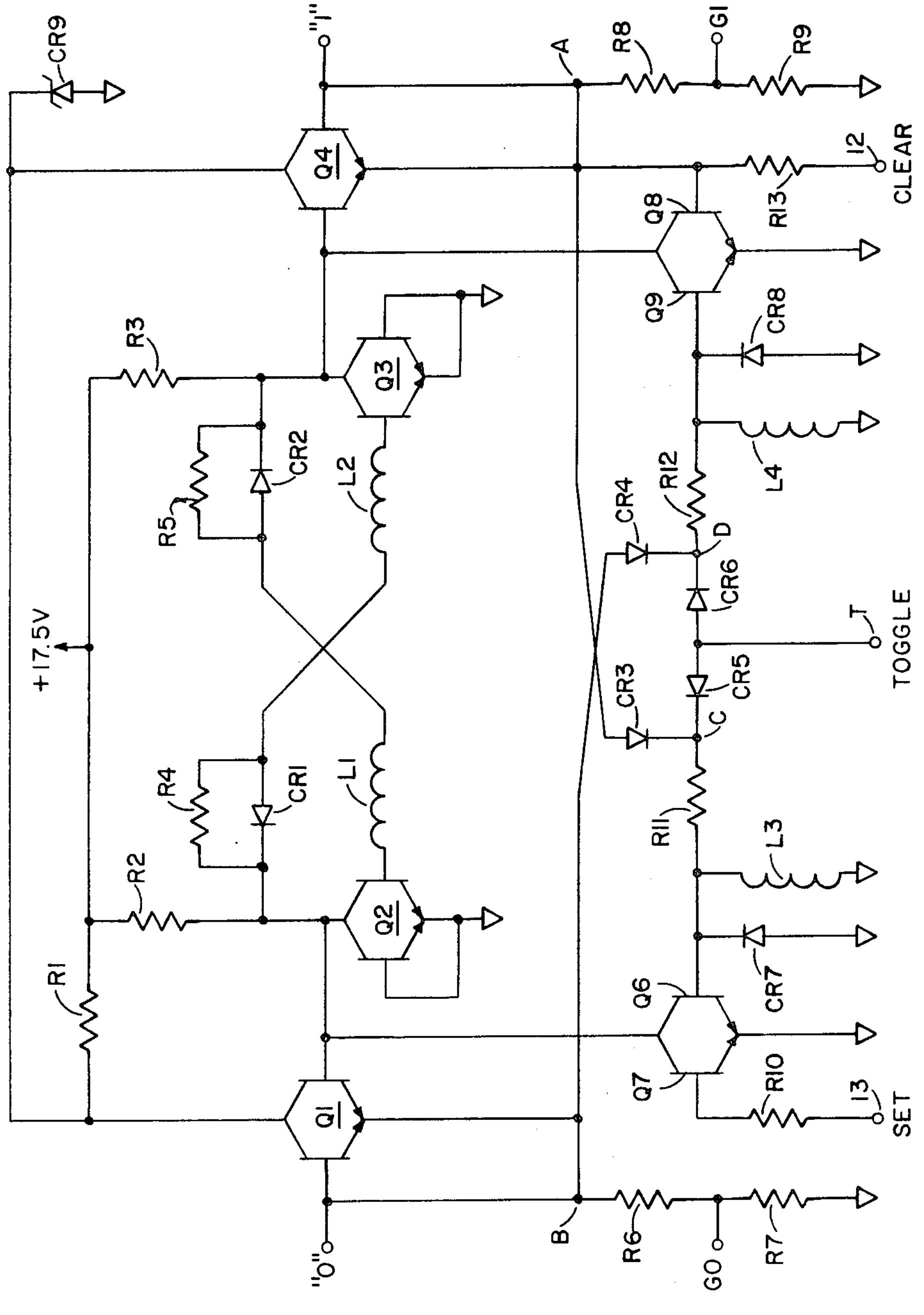
Xavier F. Gonzalez,
INVENTOR.
BY Robert C. Sims
Jack W. Voigt

RADIATION HARDENED R-L FLIP-FLOP CIRCUIT

BACKGROUND OF THE INVENTION

This disclosure is related to the field of flip-flop circuits. More particularly this disclosure is related to the retention of the binary state of the flip-flop through a nuclear blast. Flip-flop circuits upon entry into a nuclear environment, generate photo-currents in their transistors, thus tending to drive them into saturation. Flip-flops of the prior art can not maintain their state in the event of a nuclear blast as the radiation therefrom would drive the transistors to saturation, and once the radiation had subsided, the circuit would go to a random state.

SUMMARY OF THE INVENTION

The flip-flop circuit of this invention retains its initial binary state through a nuclear blast by storing energy in one of two inductors in the cross-over paths which would be determined by the initial state of the flip-flop. Upon entry into a nuclear environment, photocurrents are generated in the transistors of the circuit, thus tending to drive them into saturation. The stored energy in one of the inductors which are connected to the base circuit of the primary triggering transistors will start to decay upon entry into a high radiation environment such as that caused by a nuclear blast. The rate of this decay is determined by the time constant of the circuit. If the time constant is sufficiently long to outlast the high radiation level, then the stored energy in the inductor will supply current to the base of the transistor which was initially ON thereby keeping said transistor in an ON condition. The other primary transistor will go to an OFF condition once the radiation level has reduced to a low level. In this way the initial state of the flip-flop will be maintained. In order to increase the circuit time constant, back biased diodes are provided in the cross-over paths. Resistors are connected in parallel with these diodes to provide a normal current path. During the high radiation level these back biased diodes will produce photocurrents which will tend to supply a helping current to the inductor and short out the resistor, thereby increasing the time constant by an amount proportional to the radiation level. This is so because the higher the radiation level the higher the photocurrents produced by these diodes. A toggle circuit is provided for the flip-flop so as to change the state of the flip-flop, and SET and CLEAR circuits are provided to put the flip-flop circuit into a predetermined condition.

BRIEF DESCRIPTION OF THE DRAWING

The single FIGURE is a schematic showing of a preferred embodiment of the invention.

DESCRIPTION OF THE PREFERRED EMBODIMENT

Referring to the FIGURE, assume that the flip-flop is initially set in its "1" state. This would mean primary transistor Q2 is ON and primary transistor Q3 is OFF. The potential at the collector of transistor Q2 will then be essentially zero, and the potential at the collector of Q3 would be the +17.5 volts of the supply voltage. These conditions cause transistor Q1 to be OFF and transistor Q4 to be ON. It should be noted that transistors Q1, Q2, Q3, and Q4 are shown as pairs of transistors, however, a single transistor may be used for each of the pairs shown. With transistor Q4 in its ON state the signal at point A and output G1 are at a high level and signals developed at circuit point B and output GO are low. Under these conditions, no current is flowing in the cross-over circuit path including R4, CR1 and L2. However, a supplying base current is provided from the source connection and R3 by the cross-over circuit path of R5, CR2, and L1. No current will be flowing through diode CR2 as it is back connected. Switching of the flip-flop from this initial state may be effected by supplying a positive signal to the toggle input T. The positive signal causes current to flow through diode CR6. Current is prevented from flowing through diode CR5 as it is reversed biased because the voltage at point A and, hence, point C by way of diode CR3 is high. The signal from diode CR6 is differentiated by resistor R12 and inductor L4. The positive portion of the differentiated signal causes transistor Q9 to conduct, and essentially connects the base of transistor Q4 and collector of transistor Q3 to ground potential. Ground potential is indicated by the large arrows pointed down. This condition cuts off the base current flowing to transistor Q2 which, in turn, causes the collector of transistor Q2 to go high. After a delayed interval, determined by the component values of resistors R2 and R4 and inductor L2, base current is supplied to transistor Q3. Then transistor Q3 turns ON, its collector stays low, and transistor Q4 remains OFF. Since transistor Q4 is OFF, current is supplied to the base of transistor Q1; turning it ON. Therefore, signals developed at circuit point B and output GO are high, and signals developed at circuit A and output G1 are low. This result could also have been obtained by providing a positive voltage at the clear terminal 12, however, a pulse at the clear terminal 12 will always produce a zero state of the flip-flop, whereas a pulse at the toggle terminal 2 will always set the flip-flop into a state that is the opposite of the state it was in previously. A positive pulse at set terminal 13 will place the flip-flop in a "1" condition by turning on transistor Q7. A constant voltage of about 10 volts DC is provided to transistors Q1 and Q4 by way of the circuit of resistor R1 and Zener diode CR9.

By the use of the set and clear terminals, the flip-flop circuit can be put in a predetermined state. For example, assuming transistor Q2 is in an OFF condition, the potential at the collector of Q2 is high. Then, a positive signal supplied to the set input causes transistor Q7 to conduct and essentially connects the collector of transistor Q2 and the base of transistor Q1 to ground potentials. This operation removes base current from transistor Q3 causing the collector of transistor Q3 to go high. In turn, current is caused to flow to the base of transistor Q2 after a delay interval determined by the component values of resistor R3 and R5 and inductor L1. Then transistor Q2 remains ON, transistor Q3 remains OFF, and transistor Q4 is caused to conduct. Since transistor Q4 is ON and transistor Q1 is OFF, the signals developed at circuit point A and output G1 are high while the signals developed at circuit point B and output GO are low.

When the flip-flop circuit is subject to high radiations, by any cause, currents are generated in the flip-flop transistors which tend to drive them into saturation. This condition would cause the initial state of the flip-flop to be lost were it not for the action of the inductors L1 and L2. By the use of the inductors L1 and L2 in conjunction with diodes CR1 and CR2 in the flip-flop cross-over paths, the problem of losing the flip-flop state is overcome. Once again assume that the flip-flop is in the "1" state. This means that transistor Q2 is ON, and current is being supplied to the base of transistor Q2 by way of resistors R3 and R5 and inductor L1. Diode CR2 is not conducting. Now, when the circuit is subjected to ionizing radiation, diode CR2 is caused to generate a photocurrent which aids the current flow through inductor L1, i.e., the photocurrent also flows to the base of transistor Q2. The photo current generated by diode CR2 operates to increase the time constant of the cross-over circuit path including inductor L1 by essentially shortening out resistor R5 during the radiation period. The longer time constant, i.e., the additional base current, causes the flip-flop to retain its initial state after the radiation subsides. The higher the radiation the more diode CR2 will conduct and therefore the longer the time constant. As the radiation subsides, the additional photocurrent from diode CR2 also subsides. However, the energy stored in the inductor L1 tends to maintain the current flowing to the base of transistor Q2 and, therefore, maintains the initial state of the flip-flop; namely Q2 is ON. At the same time photocurrents will be generated by diode CR1, however, since the initial current through inductor L2 was zero, inductor L2 will oppose this current. The operation of the circuit is essentially the same if the initial state of the flip-flop were at the zero state.

I claim:

1. In a flip-flop circuit having first and second controlled switching means which are controlled by first and second cross-over paths; the improvement comprising first and second inductors connected respectively in the first and second cross-over paths so that when the flip-flop circuit is subjected to a high level radiation it will retain its initial state after the radiation has subsided; a parallel combination of a resistor and a diode connected in series with the inductor of each cross-over path; said first and second switching means are first and second transistors; said transistors each having first and second load electrodes and a base electrode; first and second resistors having first and second sides; a voltage input connection; said first sides of each resistor being connected to said voltage input connection; the second side of said first and second resistors being connected respectively to the first load electrodes of said first and second transistors; the second load electrodes of said first and second transistors being connected to a common point; said first inductor and one of said parallel combination of resistor and diode being connected in series between the second side of said second resistor and the base electrode of said first transistor; the second inductor and the other parallel combination of said resistor and diode being connected in series between the base electrode of said second transistor and the second side of the second resistor; said diodes being connected such that they oppose the current flow from the voltage input connection; said diodes producing a photocurrent when subjected to said high radiation which will be in the same direction as any current that may be flowing in the inductor of its cross-over path; and first and second output indicating means connected respectively to the second side of said first and second resistors so as to indicate the state of the flip-flop circuit.

* * * * *